United States Patent [19]

Tsubaki et al.

[11] 4,424,321
[45] Jan. 3, 1984

[54] PROCESS FOR PRODUCING COPOLYMER OF ETHYLENE

[75] Inventors: Kazumi Tsubaki; Noriaki Koto; Toyohiko Abe, all of Ichihara, Japan

[73] Assignee: Nissan Chemical Industries, Ltd., Tokyo, Japan

[21] Appl. No.: 326,926

[22] Filed: Dec. 2, 1981

[30] Foreign Application Priority Data

Dec. 27, 1980 [JP] Japan ................. 55-185452

[51] Int. Cl.³ .................. C08F 4/02; C08F 210/16
[52] U.S. Cl. ..................... 526/128; 526/127; 526/348.2; 526/348.4; 526/348.5; 526/348.6; 526/903
[58] Field of Search ........................ 526/128

[56] References Cited

U.S. PATENT DOCUMENTS

| | | | |
|---|---|---|---|
| 3,907,759 | 9/1975 | Okada et al. | 526/128 |
| 4,115,319 | 9/1978 | Scata et al. | 526/125 |
| 4,258,167 | 3/1981 | Tsubaki et al. | 526/128 |

FOREIGN PATENT DOCUMENTS 10428 4/1980 European Pat. Off. ......... 526/348.3

*Primary Examiner*—Edward J. Smith
*Attorney, Agent, or Firm*—Oblon, Fisher, Spivak, McClelland & Maier

[57] ABSTRACT

A copolymer of ethylene and a $C_4$-$C_{10}$ α-olefin at a content of 0.5 to 10 mol % is produced by forming a polymerization catalyst system by reacting a Grignard reagent with a chain or cyclic hydropolysiloxane having the unit $$R^1{}_a H_b SiO_{(4-a-b/2)}$$

($R^1$ represents an alkyl, aryl, aralkyl, alkoxy or aryloxy group; a is 0, 1 or 2; b is 1, 2 or 3 and $a+b \leq 3$), to form a reaction product (a); reacting the reaction product (a) with at least one compound having the formula $$R^2{}_n M^{(2)} X_{z-n}$$

($R^2$ represents a $C_1$ to $C_{12}$ hydrocarbon moiety; M represents Al or Si; z represents atomic value of 3 or 4; X represents a halogen atom; n is 0, 1 . . . (z-1) in the presence of an aromatic hydrocarbon solvent at lower than 85° C. to form a reaction product (b); and reacting the reaction product (b) with at least one titanium halide in the presence of an organic acid ester (c) to obtain a solid catalytic component (A) and adding an organoaluminum compound (B) and then, polymerizing ethylene and a $C_4$-$C_{10}$ α-olefin in the presence of a catalytic amount of the polymerization catalyst system in an inert hydrocarbon solvent or in a liquid form of the $C_4$-$C_{10}$ α-olefin in which ethylene is dissolved.

9 Claims, No Drawings

PROCESS FOR PRODUCING COPOLYMER OF ETHYLENE

BACKGROUND OF THE INVENTION:

1. Field of the Invention:

The present invention relates to a process for producing a copolymer of ethylene. More particularly, it relates to a process for producing a copolymer of ethylene and α-olefin by using a catalyst which has high catalytic activity capable of eliminating a step of separation of the catalyst residue and which forms the copolymer having excellent powdery characteristic in the case of a slurry polymerization process.

2. Description of Prior Art:

Recently, various proposals have been found on a process for producing a polyolefin having high stereospecific characteristic at remarkably high yield of the polymer per a transition metal and a solid catalytic component by fixing a transition compound and an electron donor on a carrier.

As one proposal, the inventors have proposed to use a catalyst system of an organoaluminum compound and a solid catalytic component obtained by reacting a titanium halide with a reaction product of an aluminum or silicon halide with a reaction product of a specific silicon compound with Grignard reagent in the presence of an organic acid ester as disclosed in Japanese Unexamined Patent Publication No. 107987/1979.

The catalyst system does not impart high productivity of the polymer per a solid catalytic component when the catalyst system is used for a homopolymerization of ethylene.

SUMMARY OF THE INVENTION

It is an object of the present invention to provide a process for producing a copolymer of ethylene having high tensile impact strength at high productivity of the polymer.

Another object of the present invention is to provide a process for producing a copolymer of ethylene and a $C_4$–$C_{10}$ α-olefin which has excellent powdery characteristics such as high bulk density and narrow size distribution in the case of a slurry polymerization process.

The other object of the present invention is to provide a process for producing a copolymer of ethylene and a $C_4$–$C_{10}$ α-olefin having excellent tensile impact strength.

The foregoing and other objects of the present invention have been attained by producing a copolymer of ethylene and a $C_4$–$C_{10}$ α-olefin which comprises forming a polymerization catalyst system by reacting a Grignard reagent with a chain or cyclic hydropolysiloxane having the unit

$$R^1{}_aH_bSiO_{(4-a-b/2)}$$

($R^1$ represents an alkyl, aryl, aralkyl, alkoxy or aryloxy group; a is 0, 1 or 2; b is 1, 2 or 3 and $a+b \leq 3$), to form a reaction product (a); reacting the reaction product (a) with at least one compound having the formula

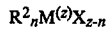

$$R^2{}_nM^{(2)}X_{z-n}$$

($R^2$ represents a $C_1$ to $C_{12}$ hydrocarbon moiety; M represents Al or Si; z represents atomic value of 3 or 4; X represents a halogen atom; n is 0, 1 ... (z-1)) in the presence of an aromatic hydrocarbon solvent at lower than 85° C. to form a reaction product (b); and reacting the reaction product (b) with at least one titanium halide in the presence of an organic acid ester (c) to obtain a solid catalytic component (A) and adding an organoaluminum compound (B) and then, polymerizing ethylene and a $C_4$–$C_{10}$ α-olefin in the presence of a catalytic amount of the polymerization catalyst system in an inert hydrocarbon solvent or in a liquid form of the $C_4$–$C_{10}$ α-olefin in which ethylene is dissolved.

DETAILED DESCRIPTION OF THE PREFERRED EMBODIMENTS

In accordance with the copolymerization of ethylene and and α-olefin, a yield of the copolymer of ethylene per a titanium component of the catalyst and a yield of the copolymer of ethylene per the solid catalytic component (A) are remarkably high whereby an adverse effect of titanium halide etc. in the copolymer is not substantially found without an expensive step of elimination of the catalyst residue.

Moreover, the copolymer of ethylene produced by the slurry polymerization process has uniform spherical shape and high bulk density and narrow size distribution especially a small content of fine powder having a diameter of less than 105 μ as 5% or less whereby the slurry of the copolymer or the dried copolymer has excellent fluidity and is easily processed to be advantageous.

The copolymer of ethylene and a $C_4$–$C_{10}$ α-olefin at a content of 0.5–10 mol % produced by the process of the present invention has excellent mechanical properties such as impact strength, stress-craking resistance and transparency, especially excellent tensile impact strength and has excellent properties suitable for a film, a pipe, an injection molded product or a rotation molded product.

The solid catalytic component (A) in the present invention can be prepared by reacting an aluminum or silicon compound with the reaction product (a) of a hydropolysiloxane with a Grignard reagent and further reacting the reaction product with a titanium halide in the presence of an organic acid ester whereby the preparation of the solid catalytic component is simple and the solid catalytic component having constant quality can be easily obtained in high reproducibility. The industrial advantages are remarkable.

It is surprising to attain high productivity of the copolymer in the case of the copolymer of ethylene and an α-olefin in spite of the fact that the catalyst system of the present invention has not high catalytic activity in the case of the homopolymerization of ethylene. The reason is not clear, however, it is considered that certain synergistic effect is imparted between the comonomer of the α-olefin and the solid catalytic component (A) or the catalyst system to contribute the synergistic effect to the increase of the catalytic activity.

The process of the invention will be further illustrated in detail.

The solid catalytic component (A) used in the present invention can be prepared as follows.

The hydropolysiloxane used in the preparation of the reaction product (a) is chain or cyclic hydropolysiloxane having the unit

$$R^1{}_aH_bSiO_{(4-a-b/2)}$$

($R^1$ is a monovalent organic group selected from the group consisting of alkyl, aryl, aralkyl, alkoxy and aryloxy group; a is 0, 1 or 2; b is 1, 2 or 3 and $a+b \leq 3$) which is a compound having suitable polymerization degree or a mixture thereof and can be a low viscosity liquid having low polymerization degree to a grease or wax having high polymerization degree and a viscosity of 100,000 c.s. at 25° C. and can be solid one.

The terminal groups of the hydroxypolysiloxane do not highly affect to the activity and can be any inert group such as trialkyl silyl.

Suitable hydropolysiloxanes include tetramethyl disiloxane, diphenyl disiloxane, trimethylcyclotrisiloxane, tetramethylcyclotetrasiloxane, methylhydropolysiloxane, phenylhydropolysiloxane, ethoxyhydropolysilxoane, cyclooctylhydropolysiloxane and chlorophenylhydropolysiloxane.

The Grignard reagent used in the preparation of the reaction product (a) is a compound having the formula $$(MgR^4_2)_p \cdot (R^4MgX)_q$$

($R^4$ is a hydrocarbon moiety; X is a halogen atom; p and q are respectively 0 to 1 and $p+q=1$) or an ether complex thereof or a mixture thereof which is obtained by reacting a halogen-containing organic compound with a magnesium metal.

Suitable Grignard reagents include $R^4MgX$($p=0$ and $q=1$) typical Grignard reagent; dihydrocarbyl magnesium having the formula $R^4_2Mg$($p=1$; $q=0$) other organomagnesium halides having the formula $$(MgR^4_2)_p \cdot (R^4MgX)_q$$

and ether complexes thereof and mixtures thereof.

The Grignard reagent can be produced by the known process for example, in an ether type solvent such as diethyl ether, dibutyl ether, tetrahydrofuran, or hydrocarbon solvent such as heptane, octane, benzene and toluene in the presence of suitable amount of a chelating agent such as ethers and amines.

The reaction product (a) used in the present invention can be easily produced by reacting the hydropolysiloxane having the formula with the Grignard reagent in suitable manner.

For example, the reaction of the hydropolysilxoane with the Grignard reagent can be attained by adding dropwise the hydropolysiloxane to the Grignard reagent under stirring and heating the mixture for suitable time after the addition.

The reaction is performed at room temperature as a severe exothermic reaction. In order to complete the reaction, it is preferable to maintain the reaction mixture at 50° to 100° C. for 1 to 5 hours though the operation is not always required. A molar ratio of hydropolysiloxane to Grignard reagent is preferably 0.05 to 1:1 of $MgR^4$:Si.

The reaction product (a) in the form of the reaction mixture can be used for the preparation of the reaction product (b). When a large amount of ether of the Grignard reagent is included, a part or whole of the solvent is separated from the reaction mixture containing the reaction product (a) and an inert aromatic hydrocarbon is added to dissolve the reaction product (a) and the solution is used for the preparation of the reaction product (b). The reaction product (a) has a characteristic for dissolving in an aromatic hydrocarbon solvent such as toluene, benzene and xylene. Accordingly, in order to prepare the reaction product (b) in smooth and high reproducibility to obtain a reaction product (b) having excellent particle size characteristic, the reaction product (a) is dissolved into the aromatic hydrocarbon solvent to form a solution and it is used for the preparation of the reaction product (b).

The compound having the formula $$R^2_n M^{(z)} X_{z-n}$$

($R^2$ is a $C_1$—$C_{12}$ hydrocarbon moiety; M is Al or Si; z is a valent of M and 3 or 4; X is a halogen atom; n is 0, 1...(z−1)) is a halogen-containing aluminum or silicon compound and can be various compounds depending upon combinations of $R^2$, n and z.

In the case of n=0, it is shown as $M^{(z)}X_z$ such as aluminum halides and silicon halides.

In the case of $R^2$=alkyl group, it can be alkylaluminum halides and alkylsilicon halides.

Suitable compounds include aluminum compounds such as aluminum trichloride, aluminum tribromide, aluminum triiodide, diethylaluminum chloride, diisobutylaluminum chloride, ethylaluminum sesquichloride, ethylaluminum dichloride and isobutylaluminum dichloride; and silicon compounds such as silicon tetrachloride, methyl trichlorosilane, dimethyl dichlorosilane, trimethyl monochlorosilane, ethyl trichlorosilane, butyl trichlorosilane, phenyl trichlorosilane, silicon tetrabromide.

The compound having the formula $$R^2_n M^{(z)} X_{z-n}$$

can be used as a mixture thereof.

The reaction product (b) can be obtained by reacting the reaction product (a) with the compound having the formula $$R^2_n M^{(z)} X_{z-n}$$

or a mixture thereof.

It is necessary to use an aromatic hydrocarbon solvent such as benzene, toluene and xylene as the inert hydrocarbon solvent and to dissolve the reaction product (a) in the solvent in a form of solution whereby the reaction is smoothly performed and a uniform reaction product (b) having uniform quality is prepared in high reproducibility and accordingly a uniform solid catalytic component (A) having uniform quality is obtained and a copolymer of ethylene having excellent particle size characteristic is obtained in the case of the slurry polymerization process.

They can be reacted at suitable ratio. It is preferable to react them at a molar ratio of 0.1 to 10:1 of the compound of $R^2_n M^{(z)} X_{z-n}$ to Mg component in the reaction product (a).

The reaction temperature is preferably in a range of 20° to 85° C. to give a polyolefin having excellent particle characteristics such as a bulk density and a size distribution in the case of slurry polymerization process. When it is lower than 20° C., the reaction velocity is too low, and a long reaction time is required whereas when it is higher than 85° C., the particle characteristics of the reaction product (b) are inferior whereby the particle characteristics of the copolymer of ethylene in the case of slurry polymerization process are inferior, especially a bulk density is lower.

The reaction temperature and the reaction time are preferably in range of $-10°$ C. to $120°$ C. and 5 minutes to 20 hours, especially $20°$ C. to $85°$ C. and 1 to 8 hours.

The reaction product (b) can be used in the preparation of the solid catalytic component (A) in the form of the reaction mixture or after washing the reaction mixture with an inert hydrocarbon solvent such as hexane, heptane, and kerosene to separate and to recover an insoluble reaction product (b).

When an alkylaluminum halide is used in the preparation of the reaction product (b), a content of a transition metal in the solid catalytic component is remarkably increased in the preparation of the solid catalytic component (A) and a catalyst having high catalytic activity may not be obtained or a ratio of the formation of isotactic polymer may be low and accordingly it is preferable to separate the reaction product (b) as the latter process.

When the reaction product (b) which is obtained by washing with an inert hydrocarbon solvent, and separating and recovering is used, the reaction product (b) can be dried by a vacuum drying etc. or can be dispersed in an inert hydrocarbon solvent.

Titanium halide used for the reaction with the reaction product (b) in the presence of the organic acid ester (c) is a compound having the formula $$TiX^2{}_l(OR^5)_{4-l}$$

($X^2$ is a halogen atom; $R^5$ is a $C_1$-$C_8$ hydrocarbon moiety; $l$ is 1 to 4).

Suitable titanium halides include $TiCl_4$, $TiBr_4$, $Ti(OC_2H_5)Cl_3$, $Ti(OC_4H_9)Cl_3$, $Ti(OC_2H_5)_2Cl_2$, $Ti(OC_3H_7)_2Cl_2$ and $Ti(OC_4H_9)_2Cl_2$.

The reaction of the reaction product (b) with the titanium halide can be carried out in the presence or absence of an inert hydrocarbon solvent.

They can be reacted at suitable molar ratio preferably 0.1 to 150 mole of the titanium halide per 1 mole of Mg in the reaction product (b).

The organic acid ester used in the reaction of the reaction product (b) with a titanium halide, can be aliphatic carboxylic acid esters, aromatic carboxylic acid esters and alicyclic carboxylic acid esters.

It is preferable to use the aromatic carboxylic acid esters such as methyl benzoate, ethyl benzoate, methyl toluate, ethyl toluate, methyl anisate, and ethyl anisate.

An amount of the organic acid ester (c) is in a range of 0.1 to 20 mole preferably 0.5 to 5 mole per 1 mole of Mg in the reaction product (b).

The organic acid ester (c) can be added by one of the following methods.

(1) In the preparation of the reaction product (b), it is added together with the reaction product (a) and the compound of $R^2{}_nM^{(z)}X_{z-n}$.

(2) It is mixed with the reaction product (b) before reacting the reaction product (b) with the titanium halide.

(3) It is added simultaneously when adding the titanium halide to the reaction product (b) for the reaction.

(4) It is added after adding the titanium halide to the reaction product (b).

The reaction temperature and the reaction time in the reaction of the reaction product (b) with the titanium halide in the presence of an organic acid ester (c) are not limited and are usually at $50°$ to $150°$ C. for 30 minutes to 20 hours.

Thus, the solid catalytic component (A) is produced and is recovered by washing the reaction mixture with an inert hydrocarbon solvent such as hexane, heptane and kerosene to remove the soluble components.

If necessary, the solid catalytic component (A) or the reaction mixture is treated with the titanium halide and washed with an inert hydrocarbon solvent and the resulting solid catalytic component can be used.

This process is effective to maintain high catalytic activity.

The resulting solid catalytic component (A) usually contains 0.5 to 10 wt. % of Ti component and a molar ratio of the organic acid ester (c) in the solid catalytic component to Ti is in a range of 0.6 to 4.0.

The solid catalytic component (A) can be used after drying it under a reduced pressure or dispersing it in an inert solvent, in the preparation of the polymerization catalyst system.

The organoaluminum compound (B) used in the present invention is a compound having the formula $$AlR^3{}_mX^1{}_{3-m}$$

($R^3$ is a $C_1$-$C_8$ hydrocarbon moiety; $X^1$ is a halogen or hydrogen atom or an alkoxy group; m is 1, 2 or 3).

Suitable organoaluminum compounds (B) include trimethylaluminum, triethylaluminum, tributylaluminum, diethylaluminum chloride, dibutylaluminum chloride, ethylaluminum sesquichloride, diethylaluminum hydride, dibutylaluminum hydride and diethylaluminum ethoxide. One or more organoaluminum compounds can be used.

The comonomer of the $C_4$-$C_{10}$ $\alpha$-olefin used in the copolymerization of ethylene can be butene-1, pentene-1, hexene-1, 4-methylpentene-1, octene-1 and decene-1. In order to reduce the density and to improve impact strength, transparency, stress-cracking and processibility of the copolymers, it is preferable to use butene-1, hexene-1, 4-methylpentene-1 or octene-1. In order to produce a copolymer having high tensile impact strength, it is effective to use butene-1, hexene-1, 4-methylpentene-1, or octene-1. In the copolymerization of ethylene, one or more $\alpha$-olefins can be used.

The copolymerization can be carried out under the following conditions for the polymerization. A ratio of the $\alpha$-olefin to ethylene is preferably 0.001 to 20 mole per mole of ethylene. When the ratio of the $\alpha$-olefin is too low, the productivity of the copolymer per the catalyst is low as that of the homopolymer of ethylene. The effect of the present invention is not attained.

In order to produce a copolymer having high tensile impact strength, a content of a $C_4$-$C_{10}$ $\alpha$-olefin component in the copolymer is in a range of 0.5–10 mol %. When it is less than 0.5 mol %, the tensile impact strength of the copolymer is similar to that of a homopolymer of ethylene, whereas when it is more than 10 mol %, the copolymer has rubber-like property though the copolymer has high tensile impact strength.

The catalyst system for the polymerization of an olefin can be prepared by contacting the solid catalytic component (A), the organoaluminum compound (B) in the presence or absence of the inert hydrocarbon solvent. The method of contacting the components is not limited. For example, the two components are simultaneously charged in a vessel for a preparation of the catalyst or in a reactor for a polymerization which contain a solvent, and they are stirred to prepare the catalyst system.

The ratio of the components suitable for the preparation of the catalyst system is 1 to 1000 gram-atoms of Al component per gram-atom of Ti component in the catalyst system.

In the case of the preparation of the catalyst system for the copolymerization in a polymerization reactor, the catalyst system is prepared in the presence or in the absence of the monomers and ethylene and the comonomer of α-olefin are fed in the reactor.

In the case of the preparation of the catalytic system in the separated tank, a suspension of the catalytic system is charged into the polymerization reactor and ethylene and the α-olefin are fed into the reactor to easily copolymerize ethylene and the α-olefin.

The copolymerization of ethylene and the α-olefin in the process of the present invention can be carried out as those of the conventional polymerization of olefin in the presence of Ziegler Natta catalyst. The polymerization can be a slurry or solution polymerization in the inert hydrocarbon solvent or non-solvent polymerization in the liquefied comonomer solvent or in a batch system or a continuous system.

The polymerization catalyst used in the present invention can be used in a polymerization in a gaseous phase without a liquid phase. The slurry or solution polymerization is especially suitable to obtain a polymer having uniform quality. The inert hydrocarbon solvent used as the polymerization solvent can be substantially inert to the polymerization reaction and is preferably butane, hexane, heptane, kerosene or cyclohexane.

The amount of the solvent in the polymerization system is depending upon the kind of polymerization. The amount of the solvent is preferably in a range of 60–80 wt. % based on the total components in the polymerization system in the case of the slurry polymerization and in a range of 75–90 wt. % in the case of the solution polymerization.

In the preferred embodiment, excess of a $C_4$-$C_{10}$ α-olefin in a liquid form or in a solution is kept in an autoclave and ethylene is fed into the autoclave under high partial pressure so as to dissolve ethylene in the liquefied $C_4$-$C_{10}$ α-olefin or in the solution of $C_4$-$C_{10}$ α-olefin whereby the copolymerization is performed in the liquid form. The content of $C_4$-$C_{10}$ α-olefin is higher when the ratio of the $C_4$-$C_{10}$ α-olefin to the solvent is higher. When the copolymerization is stopped excess of the α-olefin should be remained in a liquid form.

It is quite important to perform the copolymerization by dissolving ethylene in the liquefied $C_4$-$C_{10}$ α-olefin or in the solution of the $C_4$-$C_{10}$ α-olefin in an inert hydrocarbon solvent. If excess of the $C_4$-$C_{10}$ α-olefin is not remained, the homopolymerization of ethylene is disadvantageously performed.

The polymerization temperature is in a range of 30° to 200° C. especially 60° to 150° C. and the polymerization pressure is in a range of 5 to 50 kg/cm$^2$. In the case of the slurry polymerization, it is in a range of 50° to 100° C.

The amount of the catalyst is preferably in a range of 0.1 to 50 m mol especially 0.3 to 10 m mol per liter of the solvent.

The molecular weight of the polymer obtained by the process of the present invention is dependent upon the polymerization temperature and the amount of the catalyst and especially it is effectively controlled by adding hydrogen in the polymerization system to obtain various grades of the copolymers.

As described above, the catalytic activity of the catalyst system is remarkably high whereby the amount of the catalyst residue in the copolymer of ethylene is quite small. Accordingly, there is no adversal effect of the catalyst residue to the quality of the copolymer of ethylene. Even though the copolymer is fabricated without separating the catalyst residue, a product having excellent hue and strength can be obtained advantageously and the industrial value is remarkably high.

The following non-limiting examples will serve to illustrate the present invention.

EXAMPLE 1

(a) Preparation of Reaction product (a) obtained by reacting hydropolysiloxane and Grignard reagent In a glass reactor dried and purged with nitrogen, 75 ml. of a solution of n-butylmagnesium chloride in tetrahydrofuran (0.167 mole of n-butylmagnesium chloride) was sampled and 10.5 ml. of methylhydropolysiloxane having terminal trimethylsilyl groups (viscosity of about 30 c.s. at 25° C.) (0.175 mole as Si) was gradually added dropwise. Because of exothermic reaction, a reactor was cooled with a coolant to control at lower than 70° C. After the addition, the reactor was kept at 70° C. for 1 hour and then, it was cooled to room temperature to obtain dark brown transparent solution. A part of the solution was sampled and the presence of the unreacted n-butylmagnesium chloride was examined by the Gilman method (J. Am. Chem. Soc. 47, 2002 (1925)). No unreacted n-butylmagnesium chloride was detected. The solution was kept at 50° C. and the solvent was distilled off under a reduced pressure to obtain 38.6 g. of white solid reaction product (a). The white solid contained 0.44 mole of tetrahydrofuran per Mg atom (a hydrolyzed product is analyzed by gas chromatography).

(b) Preparation of Reaction product (b)

In a glass reactor dried and purged with nitrogen, 12.5 g. of a white solid reaction product (a) was sampled and dissolved in 200 ml. of toluene, and then 20.4 g. of SiCl$_4$ was added dropwise at 44° to 60° C. for 1.5 hours and then, the reaction was carried out at the same temperature for 1.5 hours. After the reaction, the solid component was separated and washed for 4 times with 500 ml. of n-hexane by each decantation-filtration. Then, the solid component was dried under a reduced pressure to obtain 7.2 g. of white reaction product. The reaction product (b) contained 171 mg. (7.03 m mol) of magnesium content, 402 mg. (5.74 m mol) of chlorine content and 111 mg. (3.95 m) (3.95 m mol) of silicon content per g. of the reaction product.

(c) Preparation of solid catalytic component (A)

In a glass reactor dried and purged with nitrogen, 9.3 g. of the white reaction product (b) was sampled and then, 75 ml. of n-hexane and 15 g. of ethyl benzoate were added to suspend the reaction product (b) for 30 minutes and then, 259 g. of TiCl$_4$ was added and the reaction was carried out for 2 hours under refluxing it. After the reaction, the solid component was precipitated and 150 ml. of the supernatant was separated and 173 g. of TiCl$_4$ was added and the reaction was carried out for 2 hours under refluxing it. After the reaction, the solid component was separated and washed for 4 times with 500 ml. of n-hexane by each decantation-filtration and then, dried at 50° C. under a reduced pressure to obtain 8.5 g. of the solid catalytic component (A). The solid catalytic component (A) contained 24.0 mg. (0.501 m mol) of titanium content and 80.5 mg. (0.546 m mol) of ethyl benzoate content.

(d) Polymerization

In 1.2 liter of stainless steel autoclave equipped with a stirrer and a jacket for heating and cooling and dried and purged with nitrogen, 600 ml. of a purified n-hexane, 0.63 m mol of triethylaluminum and 8.33 mg. (0.2 mg as Ti) were sequentially charged and 12 g. of butene-1 was fed and hydrogen was fed to be a hydrogen partial pressure of 1 kg/cm$^2$ and ethylene was fed to be a total pressure of 5.0 kg/cm$^2$ G. to perform a copolymerization of ethylene and butene-1 at 60° C. for 1 hour. The gas was discharged to stop the copolymerization. The polymer was separated by a glass filter and dried at 60° C. for 5 hours under a reduced pressure to obtain 151.4 g. of white powdery copolymer of ethylenebutene-1 which had a bulk density of 0.36 g./ml and 2.1% of fine particles of less than 105μ and 5.6% of coarse particles of more than 500μ. The powder characteristics were excellent. The copolymer had a melt index of 0.12 g./10 min. measured by ASTM D-1238 at 190° C. under a load of 2.16 kg. and a density of 0.932 g./cm$^2$ measured by ASTM D-1505.

On the other hand, a polymerization solvent soluble polymer recovered from the polymerization solution was 1.2 g.

The productivity of the copolymer per g. of the solid catalytic component (A) and the productivity of the copolymer per g. of titanium component were respectively 18.3 kg./g. cat. hr. and 763.0 kg./g. Ti.hr.

The content of butene-1 component in the copolymer was measured by $^{13}$C-NMR method by using a nuclear magnetic resonance device FX-90Q manufactured by Nippon Denshi K.K. to be 1.9 mol %.

The tensile impact strength of the copolymer was measured by the method of ASTM D-1822-61T with a Type S dumbel from a press-sheet having a thickness of 1 mm which was prepared by the method of Japanese Industrial Standard K 6720. In the measurement of the tensile impact strength, Universal Impact Tester manufactured by Toyo Seiki Seisakusho was used.

The tensile impact strength (hereinafter referring to as $E_p$) of the copolymer was 730 kg. cm/cm$^2$.

EXAMPLE 2

(d) Polymerization

In accordance with the process of Example 1-d), by using the solid catalytic component (A) obtained by the process of Example 1-c) except feeding 30 g. of butene-1, a copolymerization of ethylene and butene-1 was carried out to obtain 173.9 g. of white powdery copolymer which had a bulk density of 0.33 g./ml.; 1.8% of fine particles of less than 105μ and 6.4% of coarse particles of more than 500μ; MI of 0.37 g./10 min. and a density of 0.924 g./cm$^3$. A 15.7 g. of a polymerization solvent soluble polymer was recovered from the filtrate. The productivity of the copolymer per g. of the solid catalytic component (A) and the productivity of the copolymer per g. of titanium component were respectively 22.8 kg./g. cat. hr. and 948 kg./g. Ti.hr.

The content of butene-1 component in the copolymer was 2.9 mol % and $E_p$ was 635 kg.cm/cm$^2$.

REFERENCE 1

(d) Polymerization

In accordance with the process of Example 1-d) by using the solid catalytic component (A) obtained in Example 1-c) except eliminating butene-1, a homopolymerization of ethylene was carried out to obtain 21.6 g. of white powdery polyethylene which had MI of 0.009 g./10 min. and a density of 0.947 g./cm$^3$. An amount of a polymerization solvent soluble polymer was quite small. The productivity of the polymer per g. of the solid catalytic component (A) and the productivity of the polymer per g. of titanium component were respectively 2.6 kg./g. cat. hr. and 108.0 kg./g. Ti.hr.

REFERENCE 2

(d) Polymerization

In accordance with the process of Example 1-d) by using the solid catalytic component (A) obtained in Example 1-c), except eliminating butene-1; and feeding hydrogen to be a hydrogen partial pressure of 4 kg./cm$^2$ and feeding ethylene to be a total pressure of 8 kg./cm$^2$ G., a homopolymerization of ethylene was carried out to obtain 8.4 g. of white powdery polyethylene which had MI of 0.43 g./10 min. and a density of 0.956 g./cm$^3$. An amount of a polymerization solvent soluble polymer was quite small. The productivity of the polymer per g. of the solid catalytic component (A) and the productivity of the polymer per g. of titanium component were respectively 1.0 kg./g. cat. hr. and 42.0 kg./g. Ti.hr.

$E_p$ was 212 kg.cm/cm$^2$.

EXAMPLE 3

(d) Polymerization

In accordance with the process of Example 1-d) by using the solid catalytic component (A) obtained in Example 1-c), except using 30 g. of 4-methylpentene-1 instead of butene-1, a copolymerization of ethylene and 4-methylpentene-1 was carried out to obtain 80.6 g. of white powdery copolymer which had a bulk density of 0.35 g./ml. and 3.2% of fine particles of less than 105μ and 2.8% of coarse particles of more than 500μ; and MI of 0.11 g./10 min. and a density of 0.938 g./cm$^3$. A 0.6 g. of a polymerization solvent soluble polymer was recovered from the filtrate. The productivity of the copolymer per g. of the solid catalytic component (A) and the productivity of the copolymer per g. of titanium component were respectively 9.7 kg./g.cat.hr. and 406.0 kg./g. Ti.hr.

EXAMPLE 4

(d) Polymerization

In accordance with the process of Example 1-d) by using the solid catalytic component (A) obtained in Example 1-c), except using 30 g. of 4-methylpentene-1 instead of butene-1 at a polymerization temperature of 80° C., a copolymerization of ethylene and 4-methylpentene-1 was carried out to obtain 190.1 g. of white powdery copolymer which had a bulk density of 0.36 g./ml. and 1.8% of fine particles of less than 105μ and 6.9% of coarse particles of more than 500μ; MI of 1.6 g./10 min. and a density of 0.939 g./cm$^3$. A 5.1 g. of a polymerization solvent soluble polymer was recovered from the filtrate. The productivity of the copolymer per g. of the solid catalytic component (A) and the productivity of the copolymer per g. of titanium component were respectively 23.4 kg./g. cat.hr. and 976 kg./g. Ti.hr.

The content of 4-methylpentene-1 component in the copolymer was 1.3 mol % and $E_p$ was 164 kg.cm/cm$^2$.

EXAMPLE 5

(d) Polymerization

In accordance with the process of Example 1-d) by using the solid catalytic component (A) obtained in Example 1-c), except using 60 g. of octene-1 instead of butene-1 at a polymerization temperature of 80° C., a copolymerization of ethylene and octene-1 was carried out to obtain 163.5 g. of white powdery copolymer which had a bulk density of 0.37 g./ml. and 3.3% of fine particles of less than 105μ and 6.7% of coarse particles of more than 500μ; MI of 1.12 g./10 min. and a density of 0.938 g./cm$^3$. A 7.5 g. of a polymerization solvent soluble polymer was recovered from the filtrate. The productivity of the copolymer per g. of the solid catalytic component (A) and the productivity of the copolymer per g. of titanium component were respectively 20.5 kg./g. cat. hr. and 855 kg./g. Ti.hr.

The content of octene-1 in the copolymer was 1.6 mol % and $E_p$ was 198 kg.cm/cm$^2$.

EXAMPLE 6

(b) Preparation of Reaction product (b)

In a glass reactor dried and purged with nitrogen, 11.1 g. of AlCl$_3$ was charged and dispersed in 300 ml. of tolunene and then, 12.5 g. of ethyl benzoate was added and 105 ml. of a solution of 17.3 g. of the reaction product (a) obtained in Example 1 in toluene was added dropwise at 37° to 41° C. for 4.5 hours. After the addition, the reaction was carried out at the same temperature for 2 hours and then, it was heated at 83° to 85° C. and the reaction was further carried out for 1 hour. The reaction mixture was used for the preparation of the solid catalytic component (A).

(c) Preparation of Solid catalytic component (A)

The reaction mixture was kept in a stand-still to precipitate the resulting white reaction product (b) and 250 ml. of a supernatant was removed and 433 g. of TiCl$_4$ was added and the reaction was carried out for 2 hours under a refluxing. After the reaction, the solid phase was separated and washed for 5 times with the 500 ml. of n-hexane by each decantation-filtration. After drying under a reduced pressure, 9.7 g. of a solid catalytic component (A) was obtained. The solid catalytic component contained 10.7 mg. (0.223 m mol) of Ti content, 119.6 mg. (0.796 m mol) of ethyl benzoate content per 1 g.

(d) Polymerization

In accordance with the process of Example 1-d), except using 18.7 mg. (0.2 mg. as Ti) of the solid catalytic component (A) and feeding 30 g. of butene-1, a copolymerization of ethylene and butene-1 was carried out to obtain 206.4 g. of white powdery copolymer which had a bulk density of 0.31 g./ml.; MI of 0.22 g./10 min. and a density of 0.924 g./cm$^3$. A 16.6 g. of a polymerization solvent soluble polymer was recovered from the filtrate. The productivity of the copolymer per g. of the solid catalytic component (A) and the productivity of the copolymer per g. of titanium component were respectively 11.9 kg./g. cat. hr. and 1115 kg./g. Ti.hr.

The content of butene-1 in the copolymer was 2.8 mol % and $E_p$ was 748 kg.cm/cm$^2$.

REFERENCE 3

In accordance with the process of Example 1-d) except using 18.7 mg. of the solid catalytic component (A) obtained in Example 6-c) and eliminating butene-1, and feeding hydrogen gas to be a hydrogen partial pressure of 4 kg./cm$^2$ and feeding the monomer to be a total pressure of 8 kg./cm$^2$ G, a homopolymerization of ethylene was carried out to obtain 13.2 g. of white powdery polyethylene. An amount of a polymerization solvent soluble polymer recovered from the filtrate was remarkably small.

The productivity of the polymer per g. of the solid catalytic component and the productivity of the polymer per g. of titanium component were respectively 0.71 kg./g. cat.hr. and 66.0 kg./g.Ti.hr.

EXAMPLE 7

(d) Polymerization

In 1.2 liter of stainless steel autoclave which was dried and purged with nitrogen, 600 ml. of a purified n-heptane and 0.5 m mol of diethylaluminum monochloride, 7.7 mg. (0.18 mg. as Ti) of the solid catalytic component (A) and 10 g. of butene-1 were charged and hydrogen was fed to be a hydrogen partial pressure of 0.4 kg./cm$^2$ and ethylene was fed to be a total pressure of 8.0 kg./cm$^2$ G. to copolymerize ethylene and butene-1 at 140° C. for 1 hour. After 1 hour, a small amount of methanol was fed into the autoclave to stop the copolymerization and then, the autoclave was cooled to 50° C. and the gas was purged to obtain 50.8 g. of white copolymer of ethylene and butene-1 which had MI of 1.88 g./10 min. and a density of 0.923 g./cm$^3$. The productivity of the copolymer per g. of the solid catalytic component (A) and the productivity of the copolymer per g. of titanium component were respectively 6.60 kg./g. cat. hr. and 282.2 kg./g. Ti.hr.

The content of butene-1 in the copolymer was 3.4 mol % and $E_p$ was 236 kg.cm/cm$^2$.

EXAMPLE 8

(d) Polymerization

In accordance with the process of Example 7-d), except using the solid catalytic component (A) obtained in Example 1-c) and using 40 g. of octene-1 instead of butene-1, a copolymerization of ethylene and octene-1 was carried out to obtain 69.7 g. of white copolymer of ethylene and octene-1 which had MI of 2.06 g./10 min. and a density of 0.917 g./cm$^3$.

The productivity of the copolymer per g. of the solid catalytic component and the productivity of the copolymer per g. of titanium component were respectively 9.1 kg./g. cat.hr. and 387 kg./g. Ti.hr.

The content of octene-1 component in the copolymer was 3.4 mol % and $E_p$ was 1144 kg.cm/cm$^2$.

EXAMPLE 9

(d) Polymerization

In accordance with the process of Example 1-(d) by using the solid catalytic component (A) obtained in the step of Example 1-(c) except using 45 g. of hexene-1 instead of butene-1 and copolymerizing at 75° C., a copolymerization of ethylene and hexene-1 was carried out to obtain 152.0 g. of white powdery copolymer which had a bulk density of 0.36 g/ml. and contained 3.0% of fine particles of less than 105μ and 3.2% of course particles of more than 500μ and MI of 0.65 g/10 min. and a density of 0.932 g./cm$^3$. A 7.2 g. of a polymerization solvent soluble polymer was recovered from a filtrate. The productivity of the copolymer per g. of the solid catalytic component (A) and the productivity of the copolymer per g. of titanium component were respectively 19.1 kg./g. cat.hr. and 796 kg./g.Ti.hr.

The content of hexene-1 component in the copolymer was 2.5 mol % and $E_p$ was 645 kg.cm/cm$^2$.

EXAMPLE 10

(d) Polymerization

In accordance with the process of Example 1-(d) by using the solid catalytic component (A) obtained in the step of Example 1-(c) except using 2 g. of butene-1, a copolymerization of ethylene and butene-1 was carried out to obtain 137.4 g. of white powdery copolymer which had a bulk density of 0.35 g./ml. and contained 2.6% of fine particles of less than 105μ and 4.7% of coarse particles of more than 500μ and MI of 1.06 g/10 min. and a density of 0.946 g./cm$^3$. A polymerization solvent soluble polymer recovered from a filtrate was quite small. The productivity of the copolymer per g. of the solid catalytic component (A) and the productivity of the copolymer per g. of titanium component were respectively 16.5 kg./g.cat.hr. and 687 kg./g.Ti.hr.

The content of butene-1 component in the copolymer was 1.1 mol % and $E_p$ was 220 kg.cm/cm$^2$.

EXAMPLE 11

(d) Polymerization

In accordance with the process of Example 1-(d) by using the solid catalytic component (A) obtained in the step of Example 1-(c) except using 65 g. of octene-1 instead of butene-1 and copolymerizing under a hydrogen partial pressure of 0.3 kg./cm$^2$, a copolymerization of ethylene and octene-1 was carried out to obtain 56.8 g. of a copolymer which had MI of 1.01 g./10 min. and a density of 0.907 g./cm$^3$. The productivity of the copolymer per g. of the solid catalytic component (A) and the productivity of the copolymer per g. of titanium component were respectively 7.4 kg./g.cat.hr. and 315.6 kg./g.Ti.hr.

The content of octene-1 component in the copolymer was 4.1 mol % and $E_p$ was 1496 kg.cm/cm$^2$.

REFERENCE 4

(d) Polymerization

In accordance with the process of Example 1-(d) by using 16.6 mg. (0.4 mg as Ti) of the solid catalytic component (A) obtained in the step of Example 1-(c) without using any comonomer, a homopolymerization of ethylene was carried out under a hydrogen partial pressure of 5 kg./cm$^2$ and a total pressure of 9 kg./cm$^2$G, to obtain 12.8 g. of white powdery polyethylene which had MI of 0.98 g./10 min. and a density of 0.958 g./cm$^3$. A polymerization solvent soluble polymer recovered from a filtrate was quite small. The productivity of the copolymer per g. of the solid catalytic component (A) and the productivity of the polymer per g. of titanium component were respectively 0.77 kg./g.cat.hr. and 32.0 kg./g.Ti.hr.

$E_p$ was 168 kg.cm/cm$^2$.

REFERENCE 5

(d) Polymerization

In accordance with the process of Example 1-(d) by using 16.6 mg. (0.5 mg as Ti) of the solid catalytic component (A) obtained in the step of Example 1-(c) without using any comonomer, a homopolymerization of ethylene was carried out under a hydrogen partial pressure of 5.5 kg./cm$^2$ and a total pressure of 9.5 kg./cm$^2$G to obtain 12.0 g. of white powdery polyethylene which had MI of 1.92 g./10 min. and a density of 0.960 g./cm$^3$. A polymerization solvent soluble polymer recovered from a filtrate was quite small. The productivity of the polymer per g. of the solid catalytic component (A) and the productivity of the copolymer per g. of titanium component were respectively 0.72 kg./g.cat.hr. and 30.0 kg./g.Ti.hr.

$E_p$ was 124 kg.cm/cm$^2$.

We claim:

1. A process for producing a copolymer of ethylene and from 0.5-10 mole % C$_4$-C$_{10}$ α-olefin units, which comprises: forming a polymerization catalyst system by reacting a Grignard reagent with a chain or cyclic hydropolysiloxane containing units of the formula:

$$R^1_aH_bSiO_{(4-a-b/2)}$$

wherein R$^1$ represents an alkyl, aryl, aryalkyl, alkoxy or aryloxy group;
a is 0, 1 or 2;
b is 1, 2 or 3; and
a+b is ≦3, thereby forming a reaction product (a);
reacting reaction product (a) with at least one compound having the formula:

$$R^2_nM^{(z)}X_{z-n}$$

wherein R$^2$ represents a C$_1$ to C$_{12}$ hydrocarbon moiety;
M represents Al or Si;
z represents an atomic value of 3 or 4;
X represents a halogen atom;
n is 0, 1 ... (z-1) in the presence of an aromatic hydrocarbon solvent at a temperature lower than 85° C., thereby forming a reaction product (b);
reacting the reaction product (b) with at least one titanium halide in the presence of an organic carboxylic acid ester (c), thereby obtaining a solid catalytic component (A), to which is added an organoaluminum compound (B); and then polymerizing ethylene and a C$_4$-C$_{10}$ α-olefin in a presence of a catalytic amount of the polymerization catalyst system in an inert hydrocarbon solvent or in a liquid form of the C$_4$-C$_{10}$ α-olefin in which ethylene is dissolved.

2. The process according to claim 1, wherein the hydropolysiloxane is methyl hydropolysiloxane.

3. The process according to claim 1, wherein the Grignard reagent is an organomagnesium compound obtained by reacting an organic halide with a magnesium metal.

4. The process according to claim 1, wherein the compound having the formula $$R^2_nM^{(z)}X_{z-n}$$

is aluminum chloride or silicon tetrachloride.

5. The process according to claim 1, wherein the organic hydrocarbon solvent is benzene, toluene or xylene.

6. The process according to claim 1, wherein the organic acid ester (c) is an aromatic carboxylic acid ester.

7. The process according to claim 1, wherein the organoaluminum is a compound having the formula $$AlR^3_mX^1_{3-m}$$

wherein R$^3$ represents a C$_{1-8}$ hydrocarbon moiety; X$^1$ represents a halogen atom, hydrogen atom or an alkoxy group; and m is an integer to 1 to 3.

8. The process according to claim 1, wherein the titanium halide is a compound having the formula $$TiX^2{}_l(OR^5)_{4-l}$$

wherein $X^2$ represents a halogen atom; $R^5$ represents a $C_{1-8}$ hydrocarbon moiety; and l is an integer of 1 to 4.

9. The process according to claim 1 wherein the $C_4$–$C_{10}$ α-olefin is at least one selected from the group consisting of butene-1, pentene-1, hexene-1, 4-methylpentene-1, and octene-1.

* * * * *